(12) United States Patent
Igarashi et al.

(10) Patent No.: US 11,585,043 B2
(45) Date of Patent: Feb. 21, 2023

(54) CARBON FIBER AND METHOD OF MANUFACTURING SAME

(71) Applicant: SHOWA DENKO K.K., Tokyo (JP)

(72) Inventors: Takeshi Igarashi, Tokyo (JP); Tomoyuki Takei, Tokyo (JP); Yu Gao, Tokyo (JP); Masumi Kuritani, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 335 days.

(21) Appl. No.: 16/756,250

(22) PCT Filed: Oct. 17, 2018

(86) PCT No.: PCT/JP2018/038625
§ 371 (c)(1),
(2) Date: Apr. 15, 2020

(87) PCT Pub. No.: WO2019/082757
PCT Pub. Date: May 2, 2019

(65) Prior Publication Data
US 2021/0062407 A1    Mar. 4, 2021

(30) Foreign Application Priority Data
Oct. 27, 2017 (JP) .............................. JP2017-208032

(51) Int. Cl.
| | |
|---|---|
| *D06M 11/74* | (2006.01) |
| *C01B 32/05* | (2017.01) |
| *C08J 5/06* | (2006.01) |
| *D06M 23/10* | (2006.01) |
| *C01B 32/152* | (2017.01) |
| *D06Q 1/10* | (2006.01) |
| *D06M 10/00* | (2006.01) |
| *C08K 3/04* | (2006.01) |
| *D06M 101/40* | (2006.01) |

(52) U.S. Cl.
CPC ............ *D06M 11/74* (2013.01); *C01B 32/05* (2017.08); *C01B 32/152* (2017.08); *C08J 5/06* (2013.01); *C08K 3/045* (2017.05); *D06M 10/00* (2013.01); *D06M 23/10* (2013.01); *D06Q 1/10* (2013.01); *D06M 2101/40* (2013.01)

(58) Field of Classification Search
None
See application file for complete search history.

(56) References Cited

U.S. PATENT DOCUMENTS

| | | | | |
|---|---|---|---|---|
| 9,087,995 B2 * | 7/2015 | Virkar | ..................... | B82Y 30/00 |
| 2008/0089827 A1 * | 4/2008 | Miyazawa | ............ | C01B 32/156 |
| | | | | 423/445 B |
| 2009/0176112 A1 | 7/2009 | Kruckenberg et al. | | |
| 2011/0001086 A1 | 1/2011 | Kruckenberg et al. | | |
| 2011/0204319 A1 * | 8/2011 | Virkar | .................. | B82Y 40/00 |
| | | | | 977/932 |
| 2011/0204330 A1 | 8/2011 | LeMieux et al. | | |
| 2011/0223339 A1 | 9/2011 | Furukawa et al. | | |
| 2014/0001437 A1 | 1/2014 | LeMieux et al. | | |
| 2016/0265143 A1 | 9/2016 | Garnier | | |
| 2017/0314188 A1 | 11/2017 | Komukai et al. | | |
| 2020/0299582 A1 | 9/2020 | Komatsu | | |

FOREIGN PATENT DOCUMENTS

| | | | | |
|---|---|---|---|---|
| EP | 527035 A1 * | 2/1993 | ............ | B82Y 30/00 |
| JP | H05-116925 | 5/1993 | | |
| JP | 2005-035809 | 2/2005 | | |
| JP | 2005-263617 | 9/2005 | | |
| JP | 2008-230912 | 10/2008 | | |
| JP | 2009-535530 | 10/2009 | | |
| JP | 2010-137155 | 6/2010 | | |
| JP | 2013-518439 | 5/2013 | | |
| JP | 2016-060969 | 4/2016 | | |
| RU | 2523483 | 7/2014 | | |
| WO | 2016/063809 | 4/2016 | | |
| WO | 2019/087965 | 5/2019 | | |

OTHER PUBLICATIONS

English machine translation of Urvanov et al. (RU 2523483 C1) accessed online from Espacenet, PDF pp. 1-8 attached. (Year: 2012).*
PDF of Wayback Machine showing "American Elements: Fullerene Soot" available on Sep. 12, 2015. (Year: 2015).*
American Elements, Fullerene Soot, accessed online Feb. 1, 2022.
Ogasawara et al., Mechanical properties of carbon fiber/fullerene-dispersed epoxy composite, Composites Science Technology, vol. 69, Issues 11-12, Sep. 2009, pp. 2002-2007.
Office Action dated May 18, 2022 issued with respect to the related U.S. Appl. No. 16/757,863.
Urvanov Sergey Alekseyevich et al., Carbon Fiber Modified with Carbon Nanotubes and Fullerenes for Fibrous Composite Application, Journal of Materials Science and Engineering A, Nov. 10, 2013, vol. 11, pp. 725-731.
International Search Report for PCT/JP2018/038625 dated Nov. 27, 2018.
International Search Report for PCT/JP2018/038633 dated Nov. 27, 2018.
International Search Report for PCT/JP2018/038620 dated Nov. 27, 2018.

* cited by examiner

*Primary Examiner* — Katie L. Hammer
(74) *Attorney, Agent, or Firm* — IPUSA, PLLC

(57) ABSTRACT

By sequentially performing: a step (I) of dissolving fullerene $C_{70}$ in an organic solvent to prepare a fullerene solution; a step (II) of immersing a material carbon fiber in the fullerene solution; and a step (III) of extracting the carbon fiber from the fullerene solution and drying the extracted carbon fiber, a carbon fiber on which fullerene $C_{70}$ adsorbs is obtained.

6 Claims, No Drawings

US 11,585,043 B2

CARBON FIBER AND METHOD OF MANUFACTURING SAME

TECHNICAL FIELD

The present invention relates to a carbon fiber and a method of manufacturing the same.

BACKGROUND ART

Non-patent Document 1 discloses immersing a carbon fiber in a toluene solution of fullerene $C_{60}$ and thereafter drying it to obtain a carbon fiber with fullerene $C_{60}$ attached to the surface.

Patent Document 1 discloses a method of fullerene treatment of a carbon film surface by applying, with a brush or a spray, a dispersion liquid of isopropyl alcohol, in which fullerenes are dispersed, to a carbon film and then drying.

PRIOR ART DOCUMENT

Patent Document

[Patent Document 1] Japanese Laid-open Patent Publication No. 2010-137155

Non-Patent Document

[Non-Patent Document 1] Journal of Materials Science and Engineering A, 2013, 3(11), 725-731. 'Carbon Fiber Modified with Carbon Nanotubes and Fullerenes for Fibrous Composite Application'

SUMMARY OF THE INVENTION

Problem to be Solved by the Invention

However, in the method of Non-Patent Document 1, when the solvent evaporates from the carbon fiber, the aggregated and deposited fullerene is only unevenly attached to the carbon fiber surface, and the amount of fullerene attached to the carbon fiber is equal to the amount of fullerene dissolved in the solvent attached to the carbon fiber. Because the interaction between the deposited fullerene and the carbon fiber is small, when the carbon fiber is added as a reinforcing agent to resin, there is a problem that the effect of enhancing the interfacial shear strength between the carbon fiber and the resin is not sufficiently achieved. Also, in the method of Patent Document 1, fullerene is aggregated without being dissolved in a solvent, and thus the fullerene is only unevenly attached to the carbon fiber surface. Therefore, the effect of enhancing the interfacial shear strength between the fullerene and resin is insufficient.

In view of the above, the present invention has an object to provide a carbon fiber with fullerene adsorbed on the surface and a method of manufacturing the same.

Means for Solving the Problem

The inventors of the present invention have found that fullerene $C_{70}$ adsorbs on a carbon fiber under specific conditions. The inventors also have found that the carbon fiber have a higher interfacial shear strength with a resin than that of a carbon fiber on which fullerene is simply attached to the surface.

That is, the present invention provides the following in order to solve the above problems.

[1] A carbon fiber on which $C_{70}$ adsorbs.

[2] The carbon fiber according to [1], wherein the fullerene $C_{70}$ adsorbs by 0.001 parts by mass to 1 part by mass per 1000 parts by mass of the carbon fiber.

[3] A method of manufacturing a carbon fiber on which fullerene $C_{70}$ adsorbs sequentially performing:

a step (I) of dissolving fullerene $C_0$ in an organic solvent to prepare a fullerene solution;

a step (II) of immersing a material carbon fiber in the fullerene solution; and a step (III) of extracting the carbon fiber from the fullerene solution and drying the extracted carbon fiber.

[4] The method of manufacturing the carbon fiber according to [3], wherein a concentration of the fullerene $C_{70}$ in the solution is 1 ppm by mass to 1000 ppm by mass.

[5] The method of manufacturing the carbon fiber according to [4], wherein the organic solvent is an aromatic hydrocarbon or an alkyl halide.

[6] The method of manufacturing the carbon fiber according to any one of [3] to [5], wherein the material carbon fiber is a polyacrylonitrile-based carbon fiber.

[7] The method of manufacturing the carbon fiber according to any one of [3] to [6], wherein a time of immersing the material carbon fiber in the step (II) is 5 seconds to 24 hours.

[8] The method of manufacturing the carbon fiber according to any one of [3] to [7], wherein a temperature of the solution during immersion in the step (II) is 10° C. to 80° C.

Effect of the Invention

According to the present invention, it is possible to obtain a carbon fiber having a high interfacial shear strength with resin.

EMBODIMENT FOR CARRYING OUT THE INVENTION

In the following, one embodiment will be described in detail. However, the present invention is not limited thereto, and can be implemented without departing from the scope of the present invention.

<Carbon Fiber>

A carbon fiber on which fullerene $C_{70}$ adsorbs according to the present embodiment is obtained by sequentially performing: a step (I) of dissolving fullerene $C_{70}$ in an organic solvent to prepare a fullerene solution; a step (II) of immersing a material carbon fiber (which is a carbon fiber on which fullerene $C_{70}$ has not adsorbed 3-4) in the fullerene solution; and a step (III) of extracting the carbon fiber from the fullerene solution and drying the extracted carbon fiber.

Here, when performing the step (II), after immersing the material carbon fiber, the fullerene $C_{70}$ concentration in the solution decreases in comparison to the concentration before the immersion. This is also the result of adsorption of fullerene $C_{70}$ in the solution to the carbon fiber and an increase in the concentration of fullerene $C_{70}$ on the surface of the carbon fiber. The concentration of fullerene $C_{70}$ in the solution does not change simply by attachment as in Non-Patent Document 1 or Patent Document 1. Therefore, when the concentration of fullerene $C_{70}$ in the solution decreases, it is determined that the fullerene $C_{70}$ is adsorbed on the material carbon fiber, and when a decrease in the concentration is not observed, it is determined that fullerene $C_{70}$ is not adsorbed. It should be noted that the fullerene $C_{70}$ concentration in the solution is measured by a "method of measuring fullerene adsorption amount on carbon fiber", which will be described later below in Examples.

Here, the adsorption amount (parts by mass) of fullerene $C_{70}$ per 1000 parts by mass of carbon fiber is calculated by the following formula (1).

Adsorption amount=([Concentration of fullerene$C_{70}$ in fullerene solution before adsorption(*ppm*by mass)]−[Concentration of fullerene$C_{70}$ in fullerene solution after adsorption(*ppm*by mass)])× [Mass of fullerene solution(*g*)]/[Mass of carbon fiber(*mg*)]   (1)

Per 1000 parts by mass of the carbon fiber, the adsorption amount of the fullerene $C_{70}$ is preferably 0.001 parts by mass to 1 part by mass, is more preferably 0.001 parts by mass to 0.1 parts by mass, and is further more preferably 0.002 parts by mass to 0.03 parts by mass. When the adsorption amount is in this range, it is sufficiently easy to obtain the effect of enhancing the interfacial shear strength with resin.

Next, a method of manufacturing a carbon fiber on which fullerene $C_{70}$ adsorbs will be described.

<Step (I)>

In the step (I), fullerene $C_{70}$ is dissolved in an organic solvent to prepare a fullerene solution. The concentration of the fullerene $C_{70}$ in the solution in the step (I) is preferably 1 ppm by mass to 1000 ppm by mass and is more preferably 10 ppm by mass to 500 ppm by mass. When the concentration is greater than or equal to the lower limit of this range, fullerene $C_{70}$ is easily adsorbed. When the concentration is less than or equal to the upper limit of this range, the solution is easily prepared and it is economically advantageous.

The organic solvent in the step (I) is a solvent that dissolves fullerene $C_{70}$, is preferably an aromatic hydrocarbon or an alkyl halide, is more preferably at least one kind of solvent selected from benzene, toluene, xylene, trimethylbenzene, dichloromethane, chloroform, and carbon tetrachloride, and is further more preferably toluene or dichloromethane. By using such a solvent, fullerene $C_{70}$ is easily adsorbed.

<Step (II)>

In the step (II), a material carbon fiber is immersed in the fullerene solution. As the material carbon fiber used in the step (II), either a pitch-based carbon fiber or a polyacrylonitrile-based carbon fiber can be used, and a polyacrylonitrile-based carbon fiber is preferable. Such a material carbon fiber is generally used as a reinforcing agent for a carbon fiber reinforced plastic or the like, and is often desired to have a high interfacial shear strength with resin.

The time of immersing the carbon fiber in the step (II) is preferably 5 seconds to 24 hours, is more preferably 5 minutes to 12 hours, and is further more preferably 30 minutes to 2 hours. When the time is greater than or equal to the lower limit of this range, fullerene $C_{70}$ is easily adsorbed. Although the immersion may be performed for a further long time, the adsorption amount does not easily increase. Therefore, when the time is less than or equal to the upper limit of this range, the processing time is short, which is economically advantageous.

Although the fullerene solution may be used without particularly being cooled or warmed at the time of immersion in the step (II), the temperature of the fullerene solution is preferably 10° C. to 80° C., is more preferably 15° C. to 60° C., and is further more preferably 20° C. to 50° C. Within this range, fullerene $C_{70}$ is easily adsorbed and the energy of cooling or heating is small, which is economical.

<Step III>

In the step (III), the carbon fiber is extracted from the fullerene solution of the step (II) and the extracted carbon fiber is dried. The method of extracting the carbon fiber is not particularly limited, but filtration is preferable because the carbon fiber and the fullerene solution are easily separated. The drying may be performed by heating, decompression, air drying, or the like to an extent that the residual solvent of the step (II) is removed from the surface of the carbon fiber, and is not particularly limited.

Here, the fullerene remaining on the carbon fiber deposited from the solvent remaining on the carbon fiber surface at the time of drying, which is not fullerene adsorbed on the carbon fiber, is referred to as "the fullerene attached to the carbon fiber".

Because the fullerene attached to the carbon fiber is not as effective as the fullerene adsorbed on the carbon fiber, the carbon fiber may be washed with an organic solvent to recover the fullerene before the drying so that the fullerene attached to the carbon fiber is reduced. The organic solvent used for washing is preferably the solvent used for the fullerene solution in the step (I). In this case, the solution of fullerene recovered as the washing liquid can be reused as the fullerene solution in the step (I) by adjusting the concentration of the fullerene $C_{70}$, through concentration or adding and dissolving the fullerene $C_{70}$.

<Use>

A carbon fiber according to the present embodiment has a high interfacial shear strength with resin and thus is preferably used for a carbon fiber reinforced plastic.

EXAMPLES

In the following, the present invention will be described in more detail with reference to Examples and Comparative Examples. However, the present invention is not limited to Examples below.

Examples 1-3 and Comparative Examples 1-2

Using a solvent and fullerene described in Table 1, in 10 g of a solution prepared by dissolving 10 ppm by mass of the fullerene in the solvent, 100 mg of a carbon fiber (carbon fiber tow PYROFIL™ TR50S12L manufactured by Mitsubishi Rayon Co., Ltd.) from which sizing agent has been removed in advance with dichloromethane was immersed at room temperature (approximately 20° C.) for a time period described in Table 1. The solution and the carbon fiber were separated by filtration, and the solution was used for fullerene adsorption measurement. After air drying, the carbon fiber was used for an interfacial shear strength test.

<Method of Measuring Fullerene Adsorption Amount on Carbon Fiber>

For each of Examples and Comparative Examples, by high-performance liquid chromatography (device: high-performance liquid chromatography 1200 Series manufactured by Agilent Technology; column: column YMC-pack ODS-AM manufactured by YMC Co., Ltd.; developing solvent (volume ratio):toluene/methanol=51/49; flow rate: 1.2 mL/min; detection method: 308 nm ultraviolet light absorption) for which a calibration curve was created in advance with the used fullerene solution, the concentration of $C_{60}$ or $C_{70}$ in the fullerene solution before and after carbon fiber immersion was measured to calculate the adsorption amount of the fullerene on the carbon fiber according to the above-described formula (1).

<Interfacial Shear Strength Test>

For each of Examples and Comparative Examples, the interfacial shear strength was evaluated by a microdroplet test using a composite material interface property evaluation apparatus model HM410 manufactured by Toei Sangyo Co., Ltd. The microdroplet test was conducted on the carbon fiber obtained from the fullerene adsorption experiment on the carbon fiber using the carbon fiber obtained by each of Examples and Comparative Examples as a sample, (resin: PEEK 450G manufactured by Victrex plc; temperature: room temperature; atmosphere: air atmosphere; pulling rate: 0.12 mm/min). Each sample was measured 5 times and the average value was adopted.

TABLE 1

| | FULLERENE | SOLVENT | IMMERSION TIME (h) | FULLERENE ADSORPTION AMOUNT PER 1000 PARTS BY MASS OF CARBON FIBER (PARTS BY MASS) | INTERFACIAL SHEAR STRENGTH (MPa) |
|---|---|---|---|---|---|
| Example 1 | FULLERENE $C_{70}$ | TOLUENE | 24 | 0.002 | 109.5 |
| Comparative Example 1 | FULLERENE $C_{60}$ | TOLUENE | 24 | 0.000 | 107.3 |
| Example 2 | FULLERENE $C_{70}$ | DICHLOROMETHANE | 24 | 0.004 | 110.5 |
| Example 3 | FULLERENE $C_{70}$ | DICHLOROMETHANE | 2 | 0.003 | 110.2 |
| Comparative Example 2 | FULLERENE $C_{60}$ | DICHLOROMETHANE | 24 | 0.000 | 105.6 |

Fullerene $C_{70}$: nanom™ orange SU manufactured by Frontier Carbon Corporation
Fullerene $C_{60}$: nanom™ purple SUH manufactured by Frontier Carbon Corporation The present application is based on and claims priority to Japanese Patent Application No. 2017-208032, filed on Oct. 27, 2017, the entire contents of which are hereby incorporated herein by reference.

The invention claimed is:

1. A method of manufacturing a carbon fiber including fullerene $C_{70}$ on a surface thereof, the method comprising sequentially performing:
    dissolving fullerene $C_{70}$ in an organic solvent to prepare a fullerene solution;
    immersing a material carbon fiber in the fullerene solution; and
    extracting the carbon fiber from the fullerene solution, washing the extracted carbon fiber with an organic solvent, and drying the washed carbon fiber.

2. The method of manufacturing the carbon fiber according to claim 1, wherein a concentration of the fullerene $C_{70}$ in the solution is 1 ppm by mass to 1000 ppm by mass.

3. The method of manufacturing the carbon fiber according to claim 1, wherein the organic solvent is an aromatic hydrocarbon or an alkyl halide.

4. The method of manufacturing the carbon fiber according to claim 1, wherein the material carbon fiber is a polyacrylonitrile-based carbon fiber.

5. The method of manufacturing the carbon fiber according to claim 1, wherein a time of immersing the material carbon fiber is 5 seconds to 24 hours.

6. The method of manufacturing the carbon fiber according to claim 3, wherein a temperature of the solution during immersion is 10° C. to 80° C.

\* \* \* \* \*